(12) United States Patent
Chino

(10) Patent No.: US 6,788,327 B2
(45) Date of Patent: Sep. 7, 2004

(54) TRANSFER APPARATUS

(75) Inventor: Naoyoshi Chino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/727,506

(22) Filed: Dec. 5, 2003

(65) Prior Publication Data

US 2004/0119812 A1 Jun. 24, 2004

(30) Foreign Application Priority Data

Dec. 6, 2002 (JP) .......................... 2002-354768
Jan. 15, 2003 (JP) .......................... 2003-007020

(51) Int. Cl.$^7$ .......................... B41J 2/445; G03B 27/32
(52) U.S. Cl. .......................... 347/224; 355/18; 355/78
(58) Field of Search .......................... 347/224; 355/18, 355/78

(56) References Cited

FOREIGN PATENT DOCUMENTS

| JP | 10-224609 | * | 8/1998 | ............ G03B/27/32 |
|----|-----------|---|--------|------------------------|
| JP | 2002-196424 A | | 7/2002 | |
| JP | 2002-196425 A | | 7/2002 | |
| JP | 2002-196426 A | | 7/2002 | |

* cited by examiner

*Primary Examiner*—Huan Tran
(74) *Attorney, Agent, or Firm*—Sughrue Mion, PLLC (57) ABSTRACT

The transfer apparatus transfers an image displayed in an image display area of an image display unit of transmission type to an image forming area of a light-sensitive recording medium by means of light passing through the image display unit. The apparatus has an image processing section by means of which either a size or a display position of the image to be displayed in the image display area or both are adjusted prior to image display in accordance with either a size of the image forming area or a relative position of the image forming area with respect to the image display area or both.

10 Claims, 6 Drawing Sheets

TRANSFER APPARATUS

BACKGROUND OF THE INVENTION

This invention relates to a transfer apparatus with which an image recorded digitally by a digital still camera (DSC), video camera, a personal computer or the like is displayed on image display means of transmission type such as a liquid-crystal display device (LCD) and which transfers the displayed image to a light-sensitive recording medium such as an instant photographic film that forms color by illumination with light (this process may be called "image formation").

Conventionally, various methods are known to transfer, print or otherwise record digitally recorded images onto recording media and they include an ink-jet recording system having dot-like printing heads, a laser recording system and a thermal recording system.

The ink-jet technology has several problems such as prolonged printing step, high likelihood of ink plugging and inability to perform precise printing without the receiving paper getting moist with ink.

In laser recording, lenses and other expensive optical components are required, causing the problem of increased equipment cost. Both the laser recording and thermal recording processes suffer the problem of increased power consumption and hence are unsuitable for use with mobile devices.

A problem that is common to the transfer apparatuses operating on the three recording methods and which becomes particularly noticeable in the ink-jet technology when the printing density increases is the complexity of the drive and control mechanisms and the increase in the size and cost of the apparatuses. Added to this is the problem of prolonged printing.

Under these circumstances, there have been proposed transfer apparatuses in which the image to be transferred is displayed on a liquid-crystal display device (hereunder abbreviated as LCD) and then transferred onto a light-sensitive recording medium such as an instant film at 1× magnification, thereby simplifying the system configuration and reducing the product cost (see, for example, JP 2002-196424 A, JP 2002-196425 A and JP 2002-196426 A).

Figure 9:
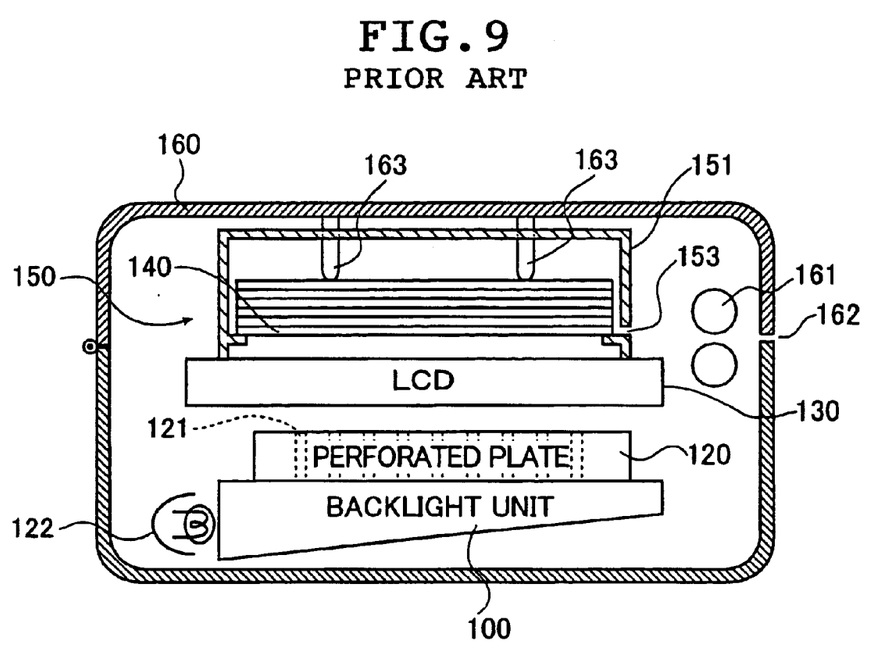
FIG. 9 is a schematic side view showing in section an outline of a prior art transfer apparatus.

FIG. 9 is a schematic side view showing in section an outline of a prior art transfer apparatus. As shown, the prior art transfer apparatus comprises a backlight unit 100 having a rod of lamp 122 as a light source, a perforated plate 120 having a large number of through-holes 121 to produce generally parallel light, a liquid-crystal display device (LCD) 130 for displaying a digitally recorded image, a film pack 150 having a multiple of light-sensitive films 140 contained in a removable film case 151, and a main case 160 enclosing all the components mentioned above.

The main case 160 includes a roller pair 161 for drawing an exposed film and spreading a processing solution on it, a slot 162 through which the exposed film is taken out of the main case 160, and backup depression pins 163 for urging a stack of light-sensitive films 140 toward the LCD 130. The roller pair 161 is mounted in a position facing a slot 153 in the film pack 150 (or film case 151) through which the exposed film is taken out.

Figure 10:
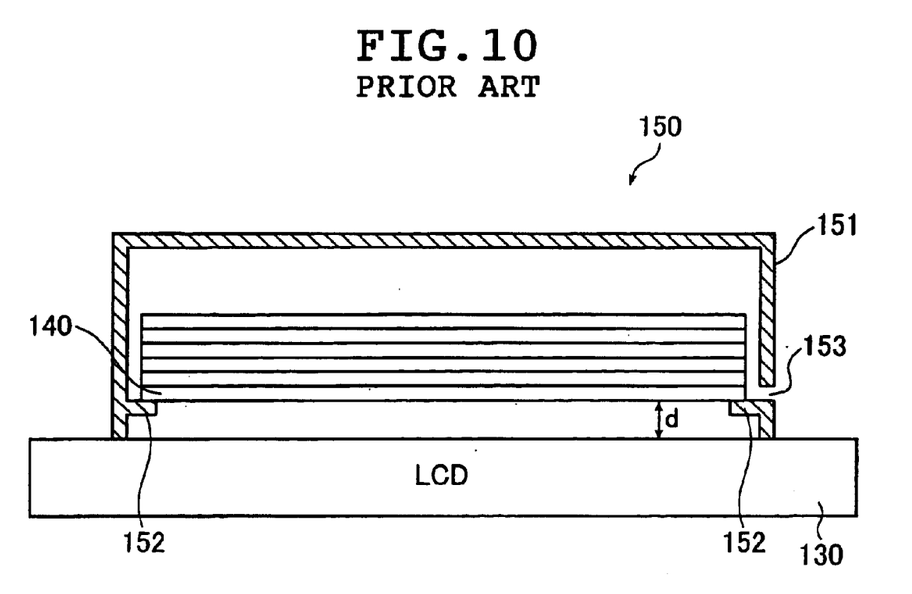
FIG. 10 is a schematic cross-sectional view showing enlarged the LCD and the film pack in the transfer apparatus of FIG. 9.

The LCD 130 and the film pack 150 as it contains a stack of light-sensitive films 140 in the film case 151 are shown enlarged in FIG. 10. As FIG. 10 shows, the film case 151 has a light-shielding rib 152 that not only prevents the light-sensitive films 140 from being exposed to light but also retains them to be confined in the interior of the film case 151.

In the prior art, the LCD 130 has required the outermost periphery of the image display area to be set aside in a width of about 4–5 mm for providing a sealing member to establish liquid-tightness, wiring, and any other necessary elements. To meet this need, the LCD 130 is usually made larger than the film case 151 as shown in FIG. 10.

In consequence, the LCD 130 and the light-sensitive film 140 are not in contact but are spaced apart by a distance of d and this has been held as the condition for producing a transfer apparatus that is easy to handle in practical applications.

Figure 11:
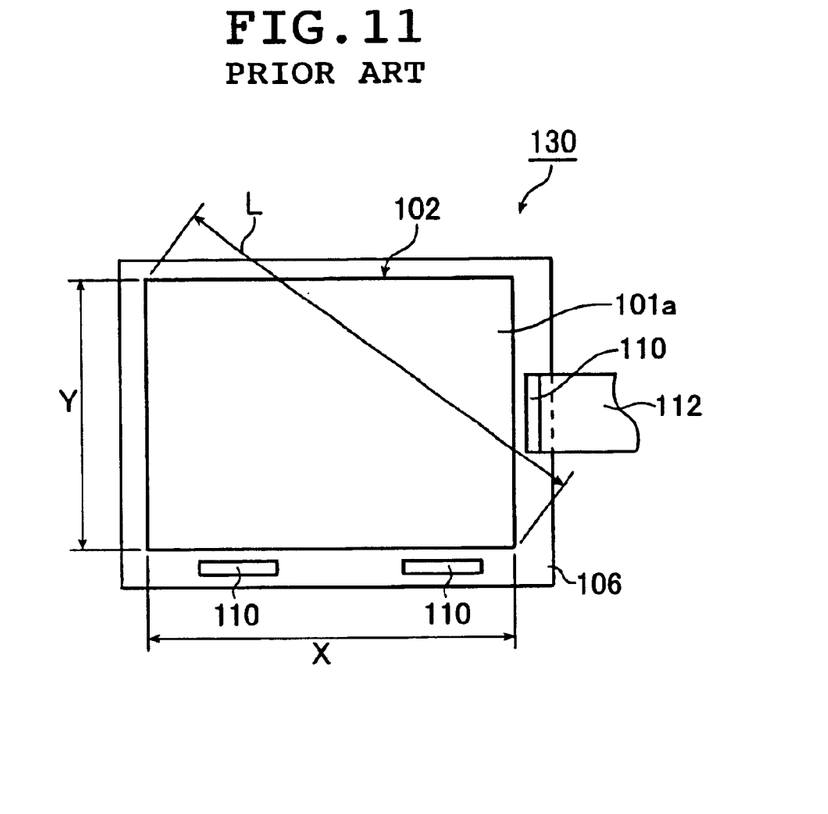
FIG. 11 is a plan view showing the liquid-crystal display device in the prior art transfer apparatus.
Figure 12:
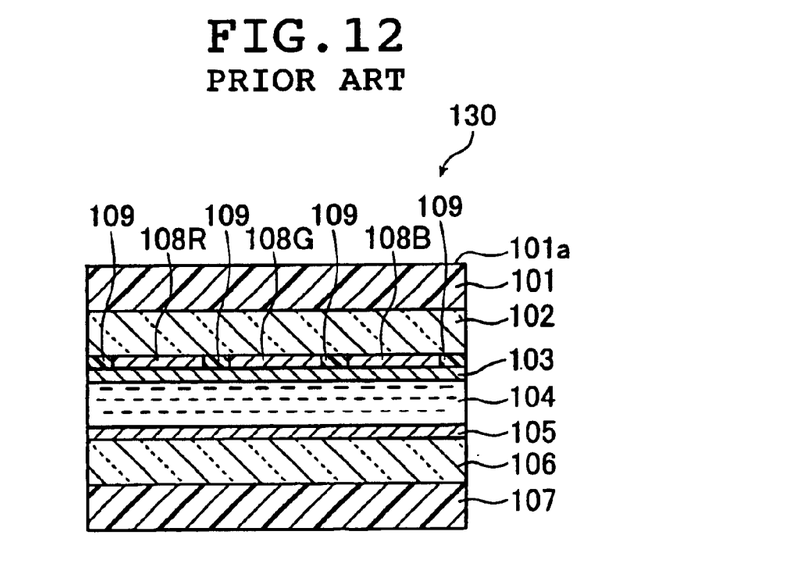
FIG. 12 is a schematic cross-sectional view showing the structure of the liquid-crystal display device of FIG. 11.

The following is a specific description of the LCD 130. FIG. 11 is a plan view of the LCD 130 and FIG. 12 is a schematic cross section showing the structure of the LCD 130.

As FIG. 11 shows, the LCD 130 has a liquid-crystal layer 104 (see FIG. 12) held between two opposed glass substrates 102 and 106, with a polarizing plate 101 (also see FIG. 12) provided on top of the glass substrate 102 which is closer to an image display screen 101a. An image is displayed on the surface of the polarizing plate 101, namely, on the image display screen 101a. The glass substrate 106 is provided on the back side of the LCD 130 that is away from the glass substrate 102 which is closer to the image display screen 101a. The glass substrate 106 has a larger area than the glass substrate 102 which is closer to the image display screen 101a and provided in its peripheral edge portion are wiring areas 110 for providing wiring or other necessary devices, etc. Connected to the wiring areas 110 are a flexible wiring 112 and other elements.

The image display screen 101a of the LCD 130 shown in FIG. 11 may be rectangular, with the ratio of its shorter side Y to the longer side X to the diagonal line L being typically 3:4:5.

We next describe the structure of the LCD 130. As shown in FIG. 12, the LCD 130 comprises the polarizing plate 101, glass substrate 102, electrode 103, liquid-crystal layer 104, electrode 105, glass substrate 106 and a film of polarizing plate 107, and these components are placed one on another in that order, with the glass substrate 102 being closer to the image display screen 101a and the glass substrate 106 being on the back side. The liquid-crystal layer 104 is sandwiched between the glass substrates 102 and 106 which, in turn, are held between the polarizing plates 101 and 107. Provided between the glass substrate 102 and the electrode 103 are R, G and B color filters 108R, 108G and 108B, as well as a black matrix 109. Needless to say, the LCD 130 has other elements including an alignment layer (not shown), as is well known in the art. In the case of a TFT LCD, the electrode 103 is a common electrode whereas the electrode 105 serves as a display electrode, a gate electrode, etc.

As is clear from FIGS. 11 and 12, the image display screen 101a of the LCD 130 is determined by specifications with respect to its size and the relative proportions of the shorter and longer sides. The light-sensitive recording medium to which an image is to be transferred also comes in various sizes with a great variety for the relative proportions of the shorter and longer sides. As a result, if one attempts to record the LCD-displayed image on the light-sensitive recording medium at 1× magnification, inconveniences may potentially occur as exemplified by the displayed image being beyond the image forming area of the light-sensitive recording medium or the transferred image coming out smaller than the image forming area. In order to avoid these problems, it is desired for the above-described prior art transfer apparatus that the image display screen 101a of the LCD 130 and the light-sensitive recording medium are adjusted to become equal in size.

However, if the manufacturer of the conventional transfer apparatus wants to have the size of the image display screen 101a of the LCD 130 match the size of the light-sensitive recording medium, it is not always possible to use a commercial LCD and a custom-made product is often required. As a result, a huge initial investment is needed, leading to an undesirably large increase in the price of the transfer apparatus as the end product.

In the other case where the light-sensitive recording medium is manufactured such that it matches the size of the LCD 130, initial investment is also required in various jobs including R&D of the light-sensitive recording medium, manufacture of the film container and the assembling step, again leading to an undesirably large increase in the price of the transfer apparatus as the end product.

As a further problem, spacing the LCD from the light-sensitive film by a specified distance as shown in FIG. 10 has been a disadvantage from the viewpoint of producing a sharp image since the resulting diffusion of light causes a blurry image. However, the above-described transfer apparatus has the light-shielding rib 152 on the film case 151 and the LCD 130 cannot be made any smaller since a certain width must be allowed for around the image display area in order to establish wiring, etc; for these and other reasons, it has been impossible to bring the LCD closer to the light-sensitive film such that their gap is smaller than the distance d shown in FIG. 10.

Conventionally, this problem has been dealt with by, for example, decreasing the thickness of the glass substrate in the LCD which is closer to the light-sensitive film. However, this method is not perfect and it has been desired to bring the image display screen of the LCD even closer to the light-sensitive film so that one can obtain a sharp image with greater ease.

SUMMARY OF THE INVENTION

The present invention has been accomplished under those circumstances and its first object is to provide a transfer apparatus with which an image of interest can be transferred to a light-sensitive recording medium in conformity with the image forming area of the latter and which requires no extra cost to manufacture.

A second object of the invention is to provide a transfer apparatus in which the image display screen of an LCD is brought sufficiently closer to the light-sensitive film than it has been in the prior art that a sharp image can be produced.

The first object of the present invention can be attained by its first aspect, in which it provides a transfer apparatus comprising: a light source; an image display unit of transmission type having an image display area that is opposed to an image forming area of a light-sensitive recording medium; and an image processing section by means of which either a size of an image to be displayed in said image display area or a display position of said image or both are adjusted prior to image display in accordance with either a size of said image forming area of said light-sensitive recording medium or a relative position of said image forming area with respect to said image display area or both, wherein said light source, said image display unit and said light-sensitive recording medium are arranged in a direction of travel of light from said light source, and said image displayed in the image display area of said image display unit is transferred to said image forming area of said light-sensitive recording medium, either directly or via an image projecting unit, by means of said light passing through said image display unit.

In such a transfer apparatus according to the present invention, it is preferable that said image displayed in the image display area of said image display unit is transferred directly to said image forming area of said light-sensitive recording medium by means of said light passing through said image display unit.

It is also preferable that said image displayed in the image display area of said image display unit is transferred to said image forming area of said light-sensitive recording medium via said image projecting unit by means of said light passing through said image display unit.

It is also preferable that said image display area of said image display unit is larger than said image forming area of said light-sensitive recording medium.

Preferably, when said size of the image to be displayed in said image display area is greater than said size of said image forming area, said image processing section reduces said image to be displayed to match said size of said image forming area and brings a center of said image to be displayed into agreement with a center of said image forming area in the direction of travel of the light from said light source before said image is displayed.

Preferably, when said size of the image to be displayed in said image display area is smaller than said size of said image forming area, said image processing section enlarges said image to be displayed to match said size of said image forming area and brings a center of said image to be displayed into agreement with a center of said image forming area in the direction of travel of the light from said light source before said image is displayed.

Preferably, when said size of the image to be displayed in said image display area is equal to said size of said image forming area, said image processing section brings a center of said image to be displayed into agreement with a center of said image forming area in the direction of travel of the light from said light source before said image is displayed.

The second object of the present invention can be attained by its second aspect, in which it provides a transfer apparatus comprising: a light source; an image display unit of transmission type having an image display screen; and a light-sensitive recording medium accommodating unit that contains one or more light-sensitive recording media and which has an opening for exposing a light-sensitive recording medium as it is opposed to the image display screen of said image display unit and an outer frame into which said image display unit is fitted, wherein said light source, said image display unit and said light-sensitive recording medium are arranged in a direction of travel of light from said light source, said image displayed by said image display unit is transferred to said light-sensitive recording medium by exposing said light-sensitive recording medium to said light passing through said image display unit and said image display unit is so adapted that it is at least fitted into said outer frame of said light-sensitive recording medium accommodating unit.

Preferably, a rib is provided on a periphery of said opening for exposing said light-sensitive recording medium of said light-sensitive recording medium accommodating unit in order to shield light from said light-sensitive recording medium and said image display unit is fitted into a space defined by an inner surface of said rib.

Preferably, at least two of four peripheral sides of said image display screen of said image display unit are smaller in width than the other two.

According to the first aspect of the invention, an image to be displayed on the image display means can be transferred to the image forming area of the light-sensitive recording medium with its size and display position being properly adjusted, so that image transfer can be accomplished in the correct position and size on the light-sensitive recording medium. In this case, the image display area of the image display means and the image forming area of the light-sensitive recording medium need not be matched to each other in terms of size and display position, so the constraint by the size of the image display means to be used in the transfer apparatus is sufficiently decreased to reduce the cost of the transfer apparatus as the end product.

According to the second aspect of the invention, the image display screen of the LCD and the light-sensitive film can be brought closer to each other than in the prior art, thus enabling a sharp enough image to be produced. Given a sharp image, the aspect ratio (thickness to hole diameter ratio) of the perforated plate can be reduced, for example, from 12 through 8 to 6. This provides ease in fabricating a perforated plate that is inexpensive and which permits more light to pass through, offering the advantage of smaller power consumption.

BRIEF DESCRIPTION OF THE INVENTION

DETAILED DESCRIPTION OF THE INVENTION

The transfer apparatus of the invention is described below in detail with reference to the embodiments shown in accompanying drawings.

Embodiment 1

To begin with, the transfer apparatus according to the first aspect of the invention is described with reference to FIGS. 1–4.

Figure 1:
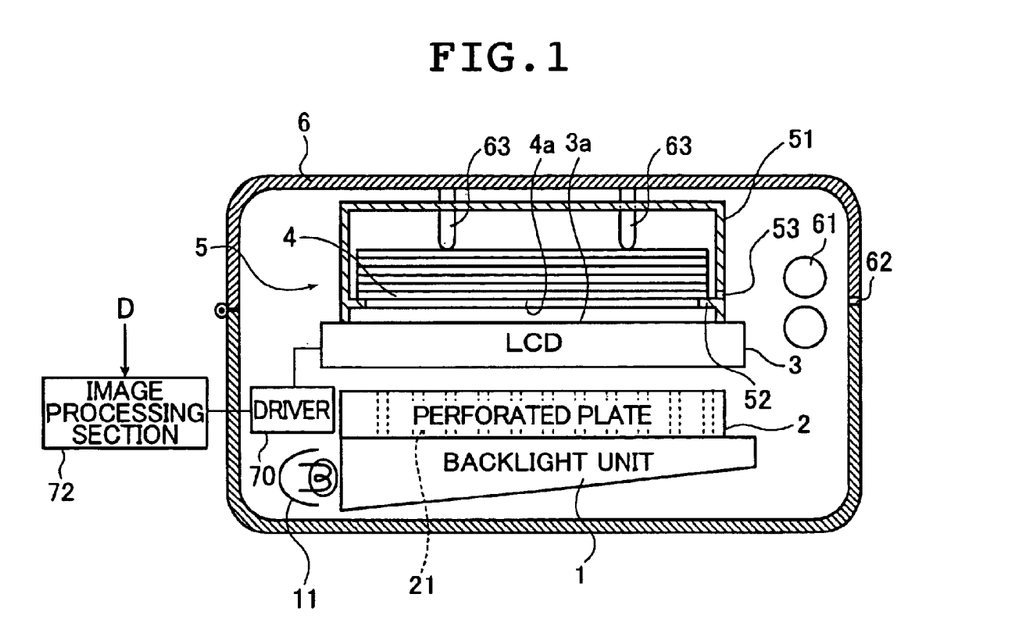
FIG. 1 is a schematic side view showing in section the transfer apparatus of Embodiment 1 according to the first aspect of the present invention.
Figure 2:
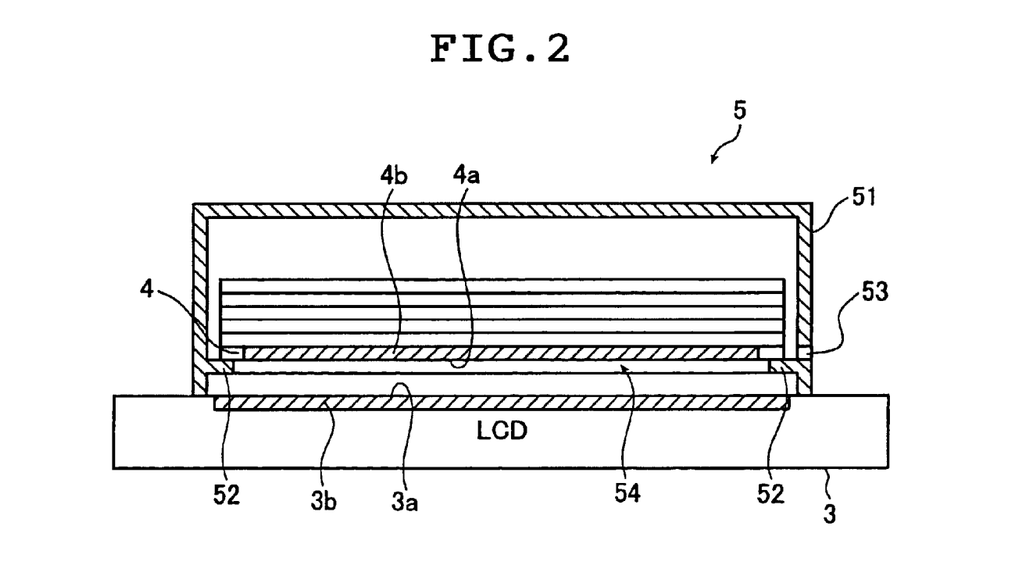
FIG. 2 is a cross-sectional view showing enlarged the LCD and the film pack in the transfer apparatus of FIG. 1.

FIG. 1 is a schematic side view showing in section the transfer apparatus of Embodiment 1 according to the first aspect of the invention and FIG. 2 is a cross-sectional view showing enlarged the liquid-crystal display device (LCD) and the film pack in the transfer apparatus of FIG. 1. In FIG. 2, the backup depression pins 63 shown in FIG. 1 are omitted.

As FIG. 1 shows, the transfer apparatus according to Embodiment 1 comprises a backlight unit 1 serving as a light source, a perforated plate 2 for producing generally parallel light, a liquid-crystal display device (hereunder abbreviated as LCD) 3 which displays a digitally recorded image, a film pack 5 having a light-sensitive film (light-sensitive recording medium) 4 contained in a removable film case 51, and a main case 6 for enclosing the above-mentioned backlight unit 1, perforated plate 2, LCD 3 and film pack 5. The LCD 3 corresponds to the image display means in the present invention.

The perforated plate 2, the LCD 3 and the light-sensitive film 4 are arranged in series in the direction of travel of the light from the backlight unit 1, with an image display screen 3a of the LCD 3 being opposed to but not in contact with an image recording face 4a of the light-sensitive film 4. An image displayed on the image display screen 3a of the LCD 3 is exposed and printed on the image recording face 4a of the light-sensitive film 4, thereby forming an image on the light-sensitive film 4.

The film case 51 is in intimate contact with the LCD 3 along the peripheral edge. Note that the LCD 3 may be spaced from the film case 5. Although not shown, the LCD 3 may be in intimate contact with the light-sensitive film 4.

As FIG. 2 shows, the LCD 3 to be used in the transfer apparatus of Embodiment 1 under consideration is such that an image display area 3b of the image display screen 3a is larger than an image forming area 4b of the image recording face 4a of the light-sensitive film 4.

As shown in FIG. 1, the film case 51 has a slot 53 in one of the two shorter sides through which the light-sensitive film 4 can be taken out. The film case 51 also has a rib 52 along the inner periphery of the side facing the LCD 3 and the space defined by the inner periphery of the rib 52 provides an opening 54. The rib 52 not only prevents the light-sensitive film 4 from being exposed to light but also retains it within the film case 51.

The main case 6 includes a roller pair 61 for drawing an exposed film and spreading a processing solution on it (and which is hereunder referred to simply as a roller pair), a slot 62 through which the exposed film is taken out of the main case 6, and backup depression pins 63 for urging a stack of light-sensitive films 4 toward the LCD 3. The roller pair 61 is mounted in a position facing the slot 53 in the film pack 5 (or film case 51) through which the exposed film is taken out.

Connected to the LCD 3 are a driver 70 and an image processing section 72.

The driver 70 converts digital image data D to drive signals for producing a display image on the LCD 3 and supplies them to wiring areas 110 (see FIG. 11).

The image processing section 72 is a means by which the image displayed in the image display area 3b of the LCD 3 on the basis of the digital image data D is brought into agreement with the size and display position of the image forming area 4b of the light-sensitive film 4. In accordance with the preliminary setting of input information about the size of the image forming area 4b of the light-sensitive film 4 or its relative position with respect to the image display area 3*b*, the image processing section 72 performs image processing to reduce or enlarge the image displayed on the basis of the digital image data D and to bring the center of the displayed image into agreement with the center of the image forming area 4*b* of the light-sensitive film 4. For image reduction or enlargement, the image processing section 72 typically performs thinning-out or interpolation of the digital image data D in a known manner. In order to bring the center of the image displayed in the image display area 3*b* into agreement with the center of the image forming area 4*b*, the image processing section 72 typically performs data rearrangement for adjusting the arrangement of the digital image data D for the image displayed in the image display area 3*b*.

The image processing section 72 may perform other image processing schemes, such as color correction, density correction and gradation correction, on the digital image data D. If the image displayed on the basis of the digital image data D is smaller than the image forming area 4*b*, it may be enlarged to be of the same size as the image forming area 4*b*. If the image displayed in the image display area 3*b* of the LCD 3 is equal in size to the image forming area 4*b* of the light-sensitive film 4, the image processing section 72 neither reduces nor enlarges the image and performs only image processing for bringing the center of the image displayed in the image display area 3*b* into agreement with the center of the image forming area 4*b* of the light-sensitive film 4.

The backlight unit 1 as a light source applies uniform light to the entire surface of the LCD 3 from the back. Being a planar light source having a light issuing face (luminous face) which is generally of the same size as the image display screen 3*a* of the LCD 3, the backlight unit 1 comprises a rod of lamp 11 such as a cold cathoderay tube and a backlight assembly having a light guide plate (not shown) into which the light issued from the rod of lamp 11 is introduced in a specified direction, a reflective sheet (not shown) for reflecting the introduced light in a generally perpendicular direction, a diffusing sheet (not shown) for rendering the reflected light uniform, a prism sheet, etc.

The backlight unit 1 to be used in Embodiment 1 is not limited to any particular type and any planar light source may be employed as long as it is adapted to ensure that the light emitting from the rod of lamp 11 is diffused uniformly by means of the backlight assembly comprising the light guide plate, reflective sheet, diffusing sheet, prism sheet, etc. Hence, any conventionally known backlight units for use in LCD may be employed.

The backlight unit 1 to be used in Embodiment 1 may be an LED array light source or a light source that employs an organic or inorganic EL panel as long as they are planar light sources that can issue light of a required optical intensity.

The perforated plate 2 is an element for producing generally parallel light which is optionally provided between the backlight unit 1 and the LCD 3 in order to collimate the light from the backlight unit 1 so that the light to be launched into the LCD 3 will be as parallel as possible. The perforated plate 2 is a rectangular plate of a specified thickness in which a large number of through-holes 21 of a specified shape and size are formed on a specified pitch.

The material of the perforated plate 2 is not limited in any particular way and it may be made of a metal (e.g. aluminum), a resin or a carbon material in a specified thickness. The thickness of the perforated plate 2 also is not limited in any particular way and a suitable value may be chosen in accordance with the sharpness required of the transferred image or with the size of the image display screen 3*a* of the LCD 3 or the image recording face 4*a* of the light-sensitive film 4.

The shape of through-holes 21 is not limited in any particular way and may be cylindrical, cylindroidal, prismatic or otherwise. Namely, the shape of through-holes 21 on a flat surface is not limited in any particular way and may be circular, elliptical, polygonal or otherwise. For ease of fabrication, a circular or polygonal shape is preferred. The through-holes 21 are preferably parallel in the direction of thickness of the perforated plate 2 but they will suffice if they can be regarded as generally parallel.

The through-holes 21 in the perforated plate 2 may be laid out in any pattern on any pitch as long as they are provided uniformly. For instance, the through-holes 21 may be laid out in a checkerboard pattern or in a zigzag pattern (in a close packed state), the latter being preferred.

These are not the sole examples of the perforated plate 2 and it may be a grid of bars that cross each other at right angles to form a large number of through-holes in a crisscross pattern. Alternatively, a narrow and slender columnar perforated plate of a specified thickness having a large number of through-holes arranged lengthwise in one or more lines may be adapted to move in the longitudinal direction of the backlight as the areas both behind and ahead of the moving plate are shielded from light.

The LCD 3 is an image display means of transmission type for displaying a digitally recorded image and it is connected to a digital image data supply source such as a digital still camera, a digital video camera or a personal computer. Supplied digital image data D is processed by the image processing section 72 and sent via the driver 70 to the LCD 3 which displays a transmitted image on the image display screen 3*a*. The digital image data supply source such as a digital camera which is connected to the LCD 3 is so configured that it can supply any image that is chosen from a set of images stored in advance. The digital image data to be supplied to the LCD 3 is not limited to the foregoing case and it may be read from a transmission original or a reflection original by means of a scanner or the like. The LCD 3 may be of any type as long as it can display a transmitted image and it may even display an image on the basis of the analog image data for an image taken with an ordinary video camera, rather than from the digital image data D. In this alternative case, the image processing section 72 is supplied with the analog image data after it has been A/D converted.

As long as image display is possible, the LCD 3 may employ an LCD device that has the structure shown in FIGS. 11 and 12, operates on a conventionally known liquid-crystal display mode and is driven by a conventionally known system. Exemplary liquid-crystal display modes include those which employ a polarizing plate as exemplified by TN mode, STN mode, CSH mode, FLC mode and OCB mode. Exemplary drive systems include not only active matrix drive systems of TFT type, diode type, etc. but also direct matrix drive systems comprising XY stripe electrodes.

The light-sensitive film 4 is used as the light-sensitive recording medium in the invention. Any light-sensitive recording medium can be used in the invention as long as it can form a visible positive image by exposing and printing on the basis of the image displayed on the LCD 3. Although not limited to any particular type, the light-sensitive recording medium is preferably a so-called "instant photographic film". Examples of the light-sensitive film 4 that can be used as such light-sensitive recording medium include monosheet-type films for instant photography having the tradenames "instax mini" and "instax" (both being films for use on "Cheki" that are manufactured by Fuji Photo Film Co., Ltd.). Such instant photographic films are commercially available as "film packs" having a predetermined number of films contained in a film case.

Thus, a multiple of light-sensitive films 4 are contained in the film case 51 (light-sensitive recording medium accommodating means). The film case 51 may be of such a type that it is permanently fixed within the main case 6 and loaded with a multiple of light-sensitive films 4 that comprise a single set (pack). Alternatively, the film case 51 may be detachable and the film pack 5 having a multiple of light-sensitive films 4 contained in this film case may be loaded as such into the main case 6. Preferably, the film pack 5 is so adapted that it can be loaded into the main case 6 as the detachable film case 51 containing a multiple of light-sensitive films 4.

The film pack 5 has a cutout (not shown) in an end portion of the film case 51 through which a claw member can enter to engage the light-sensitive film 4 and take it out of the film pack 5 (to be exact, the film case 51). The as-exposed light-sensitive film 4 is taken out of the film case 51 of the film pack 5 through the slot 53 by means of the claw member and picked up by the roller pair 61 to be sent to the outside of the apparatus through the slot 62 in the main case 6. As a result, the roller pair 61 for delivering the exposed film and spreading a processing solution on it presses a processing (developing) solution tube to rupture as it is preliminarily provided at an end of the light-sensitive film 4, whereupon the developing solution is allowed to spread uniformly across the inner surface of the light-sensitive film 4.

As is well known, films of the kind for instant photography form a complete image in about several tens of seconds after the above-described development step and the image is ready for viewing.

For the method of handling the above-described film pack, reference may be made to the instant camera using a film for instant photography which is disclosed in commonly assigned JP 4-194832.

Although not shown, the transfer apparatus of Embodiment 1 of course has a drive source (motor) for driving the roller pair 61, or a power source for driving it and turning on the rod of lamp 11 in the backlight unit 1, electronic circuits for controlling them, etc. Described above is the basic configuration of the transfer apparatus of Embodiment 1.

In the transfer apparatus of Embodiment 1, the digital image data D supplied from the digital image data supply source is subjected to image processing in the image processing section 72 such that the size of the image to be displayed in the image display area 3b is rendered equal to the size of the image forming area 4b of the image recording face 4a of the light-sensitive film 4 and that at the same time the center of the image to be displayed in the image display area 3b is brought into agreement with the center of the image forming area 4b in the direction of travel of the light from the rod of lamp 11, and the thus processed digital image data D is supplied into the driver 70. On the basis of the supplied digital image data D, an image is displayed in the image display area 3b of the LCD 3. Subsequently, the rod of lamp 11 is turned on so that generally parallel light is allowed to pass through the perforated plate 2 to be incident normal on the image display screen 3a of the LCD 3. Then, by means of the transmitted light from the LCD 3, the image displayed in the image display area 3b is exposed and printed on the light-sensitive film 4 at 1× magnification. As a result, a transferred image of the right size is formed in the right position in the image forming area 4b of the image recording face 4a of the light-sensitive film 4.

Figure 3:
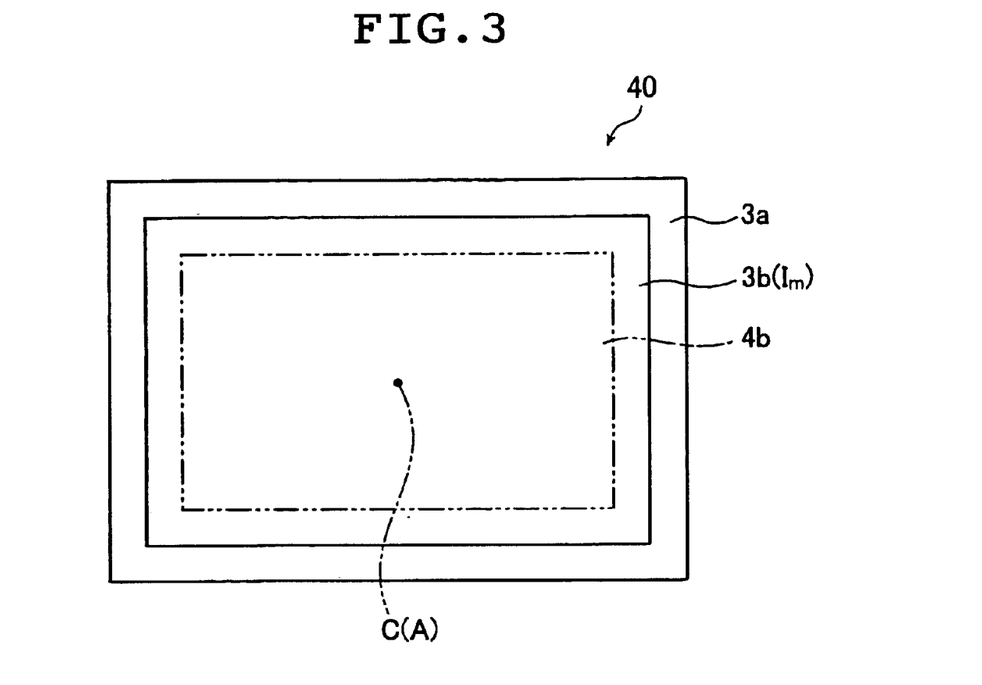
FIG. 3 shows schematically the method of transfer with the transfer apparatus of FIG. 1.

We next describe the operation of the transfer apparatus of Embodiment 1 by referring to FIG. 3, which is a schematic illustration of the method of transfer with the transfer apparatus of Embodiment 1. Shown in FIG. 3 is the glass substrate 40 on the display screen side but not the polarizing plate on it and although the image forming area 4b is shown, the light-sensitive film is not.

As shown in FIG. 3, the image display area 3b of the LCD 3 is larger than the image forming area 4b of the light-sensitive film 4 and if an image is displayed over the entire surface of the image display area 3b of the LCD 3, the displayed image comes out larger than the image forming area 4b of the light-sensitive film 4. To avoid this problem, the size of the image to be displayed and the position in which it is to be displayed are adjusted in the following manner.

First, the image processing section 72 reduces the digital image data D such that the size of an image Im to be displayed on the basis of the digital image data D becomes equal to the size of the image forming area 4b.

Suppose, for example, that the size of the image Im to be displayed in the image display area 3b and the size of the image forming area 4b are both preliminarily known. In this case, the size of the image Im to be displayed is compared with the size of the image forming area 4b and the reduction ratio is determined. Then, in order that the image Im to be displayed becomes equal in size to the image forming area 4b, the digital image data D is subjected to known processing such as thinning-out or interpolation.

In the next step, the image processing section 72 performs data rearrangement on the digital image data D in order that the center of the image Im to be displayed in the image display area 3b agrees with the center of the image forming area 4b in the direction of travel of the light from the rod of lamp 11. In this case, the relative position of the image forming area 4b inside the image display area 3b is preliminarily known from the layout of the LCD 3 and the light-sensitive film 4. Hence, data rearrangement is performed on the digital image data D in order to bring the center A of the image Im into agreement with the center C of the image forming area 4b in the direction of travel of the light from the rod of lamp 11. As a result, the image Im being displayed in the image display area 3b is not only equal in size to the image forming area 4b of the light-sensitive film 4 but also characterized in that its center is in agreement with the center of the image forming area 4b in the direction of travel of the light from the rod of lamp 11.

Then, the rod of lamp 11 is turned on, whereupon generally parallel light passes through the perforated plate 2 to be incident normal on the image display screen 3a of the LCD 3. Then, by means of the transmitted light from the LCD 3, the image Im displayed in the image display area 3b is exposed and printed on the light-sensitive film 4 at 1× magnification. As a result, a transferred image is formed in the image forming area 4b of the light-sensitive film 4.

In Embodiment 1, there is used the LCD 3 the image display area 3b of which is larger than the image forming area 4b of the light-sensitive film 4 and the image processing section 72 not only ensures that the size of the image Im to be displayed in the image display area 3b of the LCD 3 is equal to the size of the image forming area 4b of the light-sensitive film 4, but also brings the center of the image Im into agreement with the center of the image forming area 4b. As a result, one can obtain a light-sensitive film 4 on which the image Im of the right size is formed in the right position in the image forming area 4b.

In Embodiment 1, there is no need to make the size of the image display area 3b of the LCD 3 equal to the size of the image forming area 4b of the light-sensitive film 4, nor is it necessary to bring the center of the image display area 3b of the LCD 3 into agreement with the center of the image forming area 4b of the light-sensitive film 4 in the direction of travel of the light from the rod of lamp 11. Hence, one only need employ an LCD 3 whose image display area 3b is larger than the image forming area 4b of the light-sensitive film 4 to be used in the transfer apparatus. This increases the latitude in the choice of the LCD 3 and eliminates the need to seek a custom-built LCD 3; instead, a commercial LCD will do and the initial investment is sufficiently reduced to lower the cost of the transfer apparatus as the end product.

This proves effective on other types of light-sensitive recording medium. LCDs are usually fabricated with a dimensional ratio of 3:4:5 but light-sensitive recording media are not necessarily produced with this dimensional ratio. For example, instax wide (product of Fuji Photo Film Co., Ltd.) has a dimensional ratio of 1:1.58:1.87 for the shorter side, the longer side and the diagonal line, respectively, which size (dimensional ratio) is not usually found with commercial LCDs. According to the present invention, even such light-sensitive recording media can be used with a commercial LCD having a larger image display area than the image forming area.

In the present invention, image projecting means such as a lens unit may optionally be provided between the image display screen 3a of the LCD 3 and the image recording face 4a of the light-sensitive film 4 to ensure that the image displayed on the image display screen 3a of the LCD 3 is exposed and printed on the image recording face 4a of the light-sensitive film 4.

Figure 4:
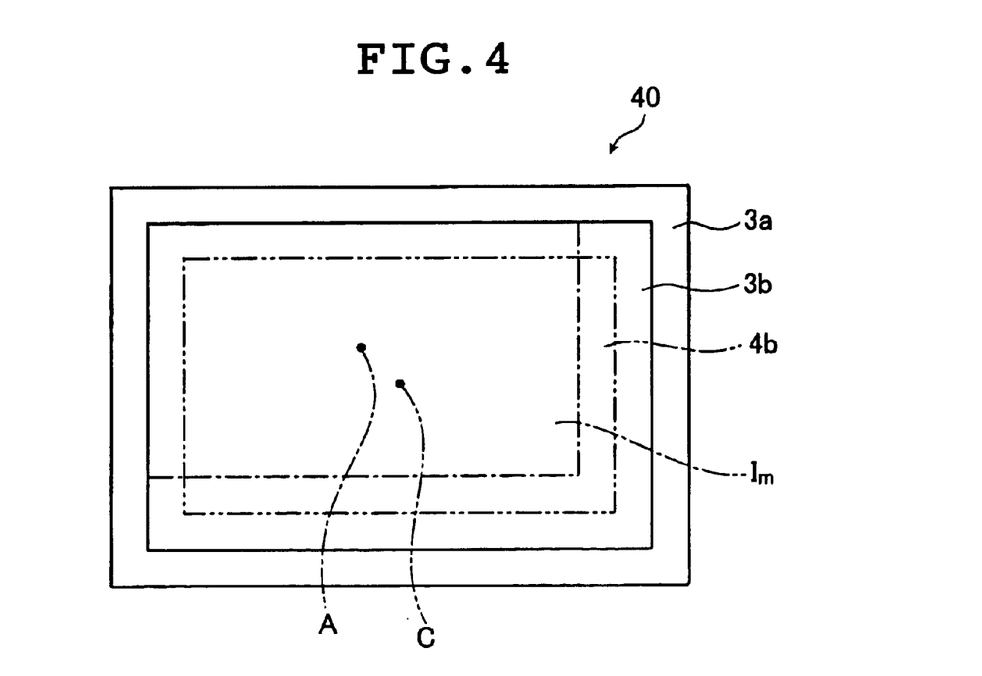
FIG. 4 shows schematically a modification of the transfer method using the transfer apparatus of FIG. 1.

We next describe a modification of the action of the transfer apparatus of Embodiment 1 by referring to FIG. 4, which schematically illustrates a modification of the transfer method in Embodiment 1.

The modification differs from Embodiment 1 in that the size of the displayed image Im is equal to the size of the image forming area 4b. Since the operation of the modification is identical to that of Embodiment 1 in other aspects, a detailed explanation thereof will be omitted.

In the modification under consideration, the image Im to be displayed is already of an equal size to the image forming area 4b, so the image processing section 72 performs only data rearrangement on the digital image data D in the same manner as in Embodiment 1 so that the center A of the image Im is brought into agreement with the center C of the image forming area 4b (see FIG. 4). Subsequent steps are identical to those in the operation of Embodiment 1, so a detailed explanation thereof will be omitted.

In the modification, the center of the image Im to be displayed which is already equal in size to the image forming area 4b is brought into agreement with the center of the image forming area 4b in the direction of travel of the light from the rod of lamp 11, so one can obtain the same result as attained in Embodiment 1.

In both Embodiment 1 and the modification just described above, the display position of the image Im is brought into agreement with the image forming area 4b by bringing the center of the image Im to be displayed into agreement with the center of the image forming area 4b. However, this is not the sole case of the invention and end points of the image Im may be brought into agreement with corresponding end points of the image forming area 4b facing that image Im (i.e., corresponding to the end points of the image Im). Alternatively, the edges of the image Im may be detected and brought into agreement with the edges of the image forming area 4b.

In both Embodiment 1 and the modification just described above, a perforated plate is used as the element for producing generally parallel light but this is not the sole case of the invention and a Selfoc lens may be substituted.

The perforated plate need not be provided on the entire surface of the image display area of the LCD and it may have a multiple of through-holes formed in only one line. In this alternative case, a linear light source is provided beneath and made integral with the perforated plate to form a linear unit capable of producing generally parallel light. This linear, generally parallel light producing unit is provided with shielding elements both behind and ahead of the unit in the direction of its movement so as to shield light other than light passing through the through-holes. In order to allow for movement of the linear, generally parallel light producing unit, the shielding elements are typically each composed of a bellows-like membrane that can extend or contract in the direction of its movement. In addition, moving means that causes the linear, generally parallel light producing unit to move in a direction perpendicular to the arrangement of through-holes is provided inside the main case in the lower position.

Embodiment 2

We next describe the transfer apparatus of Embodiment 2 according to a second aspect of the invention by referring to FIGS. 5–8.

In the LCD 3 used in Embodiment 1 depicted in FIGS. 1–4, the image display area 3b of the image display screen 3a is larger than the image forming area 4b of the image recording face 4a of the light-sensitive film 4. However, in the LCDs 36 and 38 used in Embodiment 2 depicted in FIGS. 5–8, at least two of the four peripheral sides of the image display screen are sized to be smaller in width than a specified value, with areas for wiring and the like being formed only in the other sides. Because of this reduction in size, the LCDs 36 and 38 can be fitted into the outer frame of the film case 51.

Figure 5:
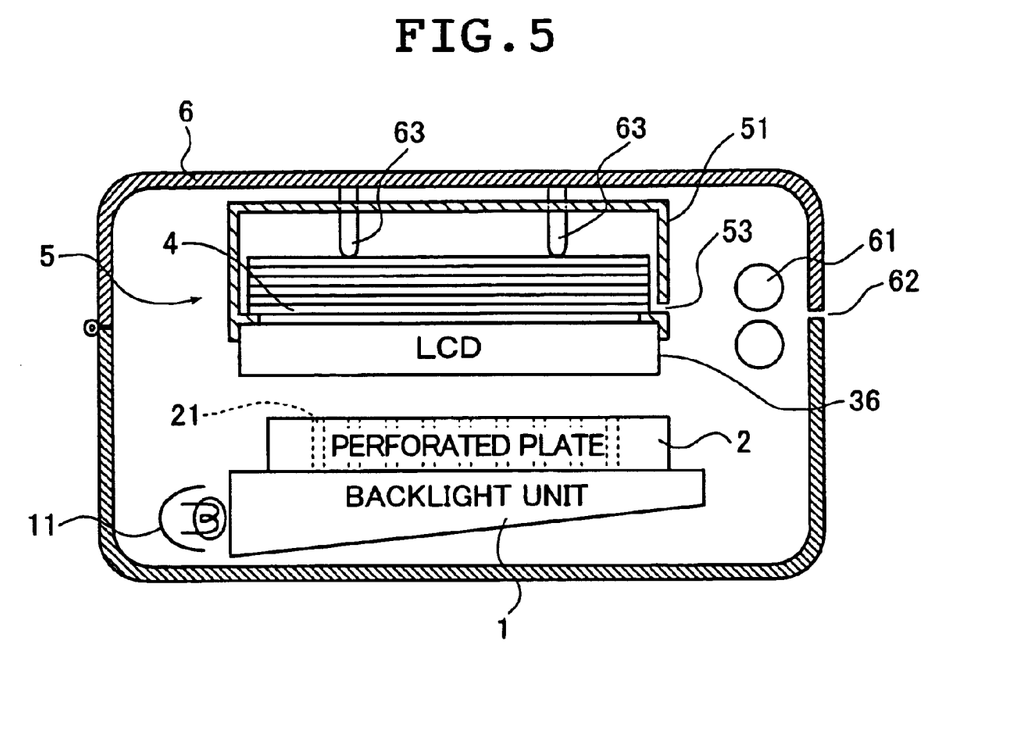
FIG. 5 is a schematic side view showing in section the transfer apparatus of Embodiment 2 according to the second aspect of the present invention.

FIG. 5 is a schematic side view showing in section the transfer apparatus of Embodiment 2 according to the second aspect of the present invention.

The transfer apparatus of Embodiment 2 depicted in FIG. 5 has the same configuration as the transfer apparatus of Embodiment 1 depicted in FIG. 1 except for the composition of the LCD, so like components are identified by like numerals and will not be described in detail.

As FIG. 5 shows, the transfer apparatus according to Embodiment 2 comprises a backlight unit 1 having a rod of lamp 11 such as a cold cathode-ray tube, a perforated plate 2 having a large number of through-holes 21 for producing generally parallel light, an LCD 36 for displaying a digitally recorded image, a film pack 5 having a multiple of light-sensitive films 4 contained in a removable film case 51, and a main case 6 for enclosing all these components.

The perforated late 2, the LCD 36 and the light-sensitive films 4 are arranged in the direction of travel of the light from the backlight unit 1, with at least the LCD 36 and the bottommost light-sensitive film 4 being preferably not placed in contact with each other. However, in order to achieve the color purity and resolution required of the present invention, the two elements may be placed in (intimate) contact with each other. The perforated plate 2 need not be provided if the light-sensitive film 4 can be briefly exposed to the light passing through the LCD 36 and if the backlight unit 1 can issue parallel light of sufficient intensity to secure the required image sharpness.

The backlight unit 1 serving as a light source is for applying uniform light to the entire surface of the LCD 36 from the back and it is a planar light source having a light emitting face (luminous face) of generally the same size as the display screen of the LCD 36.

The perforated plate 2 is an element for producing generally parallel light which is optionally provided between the backlight unit 1 and the LCD 36 in order to collimate the light from the backlight unit 1 so that the light to be launched into the LCD 36 will be as parallel as possible.

Like the LCD 3 in above-described Embodiment 1, the LCD 36 is an image display means of transmission type for displaying a digitally recorded image and, as already mentioned above, it is connected to the digital image data supply source and displays the image of interest as a transmitted image in accordance with the supplied digital image data. As in the case of the LCD 3, the digital image data supply source which is connected to the LCD 36 is so configured that it can supply any image as chosen from a set of images stored in advance. Again, as in the case of the LCD 3, the digital image data to be supplied to the LCD 36 may be of any type. Like the LCD 3, the LCD 36 may be of any type as long as it can display a transmitted image and it may even display an image on the basis of analog image data.

In the LCD 36 of Embodiment 2, at least two of the four peripheral sides of the image display screen are sized to be smaller in width than a specified value, with areas for wiring and the like being formed only in the other sides. Because of its smaller size, the LCD 36 can be fitted into the outer frame of the film case 51. Details of this point will be given later.

The light-sensitive film 4 (light-sensitive recording medium) is so designed that its light-sensitive surface is opposed to but spaced from the display screen of the LCD 36 by a specified distance (preferably, 0.01–3 mm). A multiple of such light-sensitive films 4 are contained in the film case 51. The light-sensitive film 4 is used as a light-sensitive recording medium. The light-sensitive recording medium should be able to form a visible positive image by exposure and printing of the transmitted image displayed on the LCD 3 and it may, as mentioned above, be preferably exemplified by monosheet-type films for instant photography.

As noted above, the as-exposed light-sensitive film 4 is taken out of the film pack 5 through the slot 53 and picked up by the roller pair 61 to be sent to the outside of the apparatus through the slot 62 in the main case 6 so that the roller pair 61 presses the processing (developing) solution tube to rupture as it is preliminarily provided at an end of the light-sensitive film 4, whereupon the developing solution is allowed to spread uniformly across the inner surface of the light-sensitive film 4.

As is well known, films of the kind for instant photography form a complete image in about several tens of seconds after the above-described development step and the image is ready for viewing.

Although not shown, the transfer apparatus of Embodiment 2 parallels with the apparatus of Embodiment 1 in that it has a drive source (motor) for driving the roller pair 61, a power source for driving it and turning on the rod of lamp 11 in the backlight unit 1, electronic circuits for controlling them, a data processing unit which, in order to display an image on the LCD 36, receives digital image data from the digital image data supply source and converts it into image data for LCD display, a control unit, etc.

Described above is the basic configuration of the transfer apparatus of Embodiment 2. In this aspect, an LCD of smaller size is fitted into the outer frame of the film case so that the image display screen of the LCD is brought closer to the light-sensitive film than has been possible in the prior art.

This feature is further described below.

Figure 6:
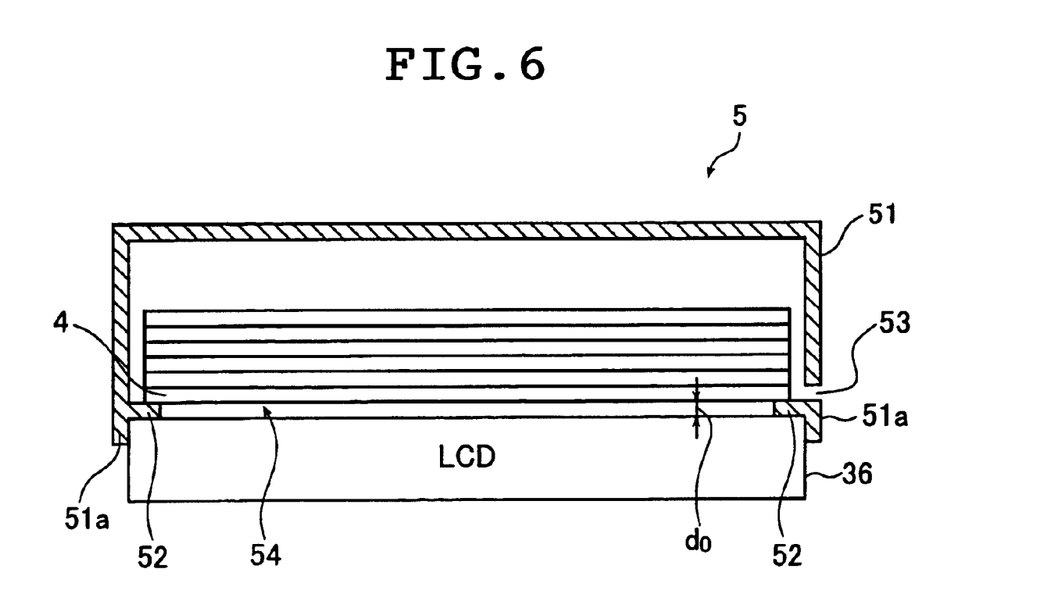
FIG. 6 is a cross-sectional view showing enlarged the LCD and the film pack in the transfer apparatus of FIG. 5.

FIG. 6 shows enlarged the film pack 5 and the LCD 36. Note that the backup depression pins 63 are omitted from FIG. 6.

As is clear from FIG. 6, the LCD 36 is fitted into the outer frame 51a of the film case 51. The outer frame 51a of the film case 51 has on its inner surface a rib 52 that not only retains the light-sensitive film 4 but also shields it from light so that it will not be exposed. The space enclosed by the inner surface of the rib 52 provides an opening 54 through which the light-sensitive film 4 as opposed to the image display screen of the LCD 36 is exposed.

Therefore, in Embodiment 2, by fitting the LCD 36 into the outer frame 51a of the film case 51, the distance between the image display screen of the LCD 36 and the light-sensitive film 4 can be reduced to as small as the thickness do of the rib 52. In the case of a film pack for use in Cheki, the distance can be reduced from d=2.8 mm in FIG. 10 to $d_0$=1.5 mm in FIG. 6.

Figure 7:
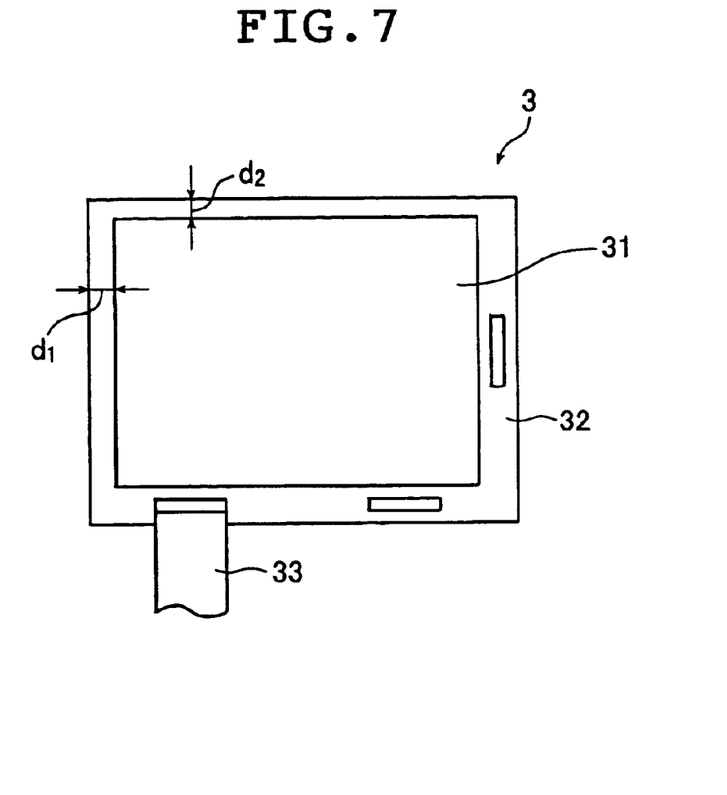
FIG. 7 is a plan view of the LCD in the transfer apparatus of FIG. 5.

FIG. 7 is a plan view of the LCD 36 having the feature described above.

As is clear from FIG. 7, the LCD 36 has a wiring area 32 formed around the image display screen 31 for attaching wiring, other devices, etc. A flexible wiring 33 may be connected to the wiring area 32.

The LCD 36 shown in FIG. 7 has two of the four peripheral sides dimensioned in narrower width than the other two; more specifically, the left and top sides have widths of $d_1$ and $d_2$ (say, as small as about 3.5 mm) and wiring, etc. are arranged on the bottom and right sides only.

As a result, the LCD 36 can be made smaller by a corresponding amount so that it can be fitted into the outer frame 51a of the film case 51. Being thus fitted, the LCD 36 offers the advantage that the size of its image display screen can be made equal to the size of the image area of the light-sensitive film 4 (i.e., the size of the screen on which actual image exposure is effected).

As described above, in the LCD used in Embodiment 2, at least two sides of the wiring area around the image display screen are smaller in width than the other two and it can be fitted into the outer frame of the film case, whereupon the distance between the image display screen of the LCD and the light-sensitive film is reduced to a smaller value than has been possible in the prior art. This makes it possible to record a sharper image on the light-sensitive film.

The foregoing description concerns the LCD in which two of the four sides surrounding the image display screen are made smaller in width than the other two. This is not the sole case of the invention and in a more preferred LCD, three of the four sides around the image display screen are made smaller in width than the other.

Described below is a modification of Embodiment 2.

In the modification, an even smaller LCD is used and fitted into the opening in the film case through which the light-sensitive film is to be exposed.

Figure 8:
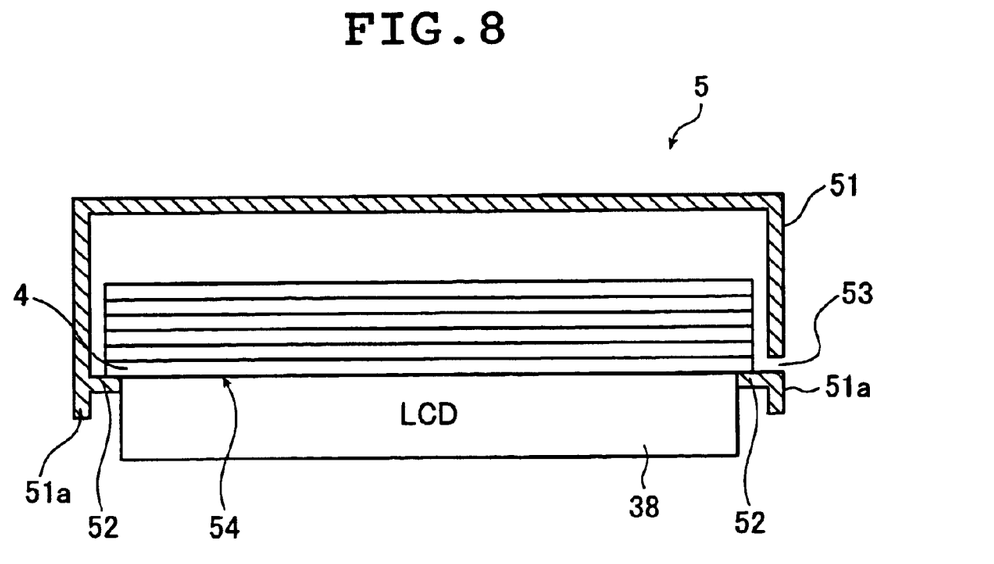
FIG. 8 is a cross-sectional view showing enlarged the LCD and the film pack in the transfer apparatus according to a different version of Embodiment 2.

FIG. 8 shows enlarged the film pack and the LCD of such modified transfer apparatus. As is clear from FIG. 8, the modified transfer apparatus is completely identical to the embodiment shown in FIG. 6 as far as the film pack 5 is concerned. The difference is that the LCD 38 is made smaller than the LCD 36 shown in FIG. 6 and can be fitted into the opening 54 for exposure which is provided by the space enclosed by the inner surface of the rib 52 on the outer frame 51a of the film case 51.

The LCD 38 may advantageously be exemplified by an LCD in which $d_1$ and $d_2$ of the left and top sides shown in FIG. 7 are further reduced to about 1.5 mm, as well as an LCD in which three of the four sides surrounding the image display screen are rendered smaller in width than the other.

The LCD 38 of such a small size can be fitted into the opening 54 for exposure in the film case 51 and it also becomes possible to bring the image display screen of the LCD 38 into contact with the light-sensitive film 4.

However, if the image display screen of the LCD 38 is in intimate contact with the light-sensitive film 4, the latter may be scratched or otherwise damaged when it is being pulled out of the film case 51 after exposure. In order to avoid this problem and provide ease in handling as well, a suitable distance may be set between the image display screen of the LCD 38 and the light-sensitive film 4.

Consider further the case where the LCD 38 is completely fitted into the exposure opening 54. The LCD 38 has the wiring area formed around its image display screen. Speaking of the light-sensitive film 4, not all of its surfaces are exposable but the size of the screen that can be actually exposed is set to a somewhat smaller value. Hence, even in the case under consideration, the image display screen of the LCD 38 can be made equal in size to the screen of the light-sensitive film 4 that can be actually exposed.

Thus, in Embodiment 2 and its modification described above, the image display screen of the LCD can be brought closer to the light-sensitive film than in the prior art and this makes it possible to produce a sharp enough image. As a further advantage, the image display screen of the LCD can be made equal in size to the image area of the light-sensitive film (its screen) and this enables economical and efficient image transfer.

While the transfer apparatus of the invention has been described in detail on the foregoing pages with reference to various embodiments, the invention is by no means limited to those embodiments and it should of course be understood that various improvements and design modifications are possible without departing from the spirit and scope of the invention.

What is claimed is:

1. A transfer apparatus comprising:
   a light source;
   an image display unit of transmission type having an image display area that is opposed to an image forming area of a light-sensitive recording medium; and
   an image processing section by means of which either a size of an image to be displayed in said image display area or a display position of said image or both are adjusted prior to image display in accordance with either a size of said image forming area of said light-sensitive recording medium or a relative position of said image forming area with respect to said image display area or both,
   wherein said light source, said image display unit and said light-sensitive recording medium are arranged in a direction of travel of light from said light source, and said image displayed in the image display area of said image display unit is transferred to said image forming area of said light-sensitive recording medium, either directly or via an image projecting unit, by means of said light passing through said image display unit.

2. The transfer apparatus according to claim 1, wherein said image displayed in the image display area of said image display unit is transferred directly to said image forming area of said light-sensitive recording medium by means of said light passing through said image display unit.

3. The transfer apparatus according to claim 1, further comprising an image projecting unit, wherein said image displayed in the image display area of said image display unit is transferred to said image forming area of said light-sensitive recording medium via said image projecting unit by means of said light passing through said image display unit.

4. The transfer apparatus according to claim 1, wherein said image display area of said image display unit is larger than said image forming area of said light-sensitive recording medium.

5. The transfer apparatus according to claim 4, wherein, when said size of the image to be displayed in said image display area is greater than said size of said image forming area, said image processing section reduces said image to be displayed to match said size of said image forming area and brings a center of said image to be displayed into agreement with a center of said image forming area in the direction of travel of the light from said light source before said image is displayed.

6. The transfer apparatus according to claim 4, wherein, when said size of the image to be displayed in said image display area is smaller than said size of said image forming area, said image processing section enlarges said image to be displayed to match said size of said image forming area and brings a center of said image to be displayed into agreement with a center of said image forming area in the direction of travel of the light from said light source before said image is displayed.

7. The transfer apparatus according to claim 4, wherein when said size of the image to be displayed in said image display area is equal to said size of said image forming area, said image processing section brings a center of said image to be displayed into agreement with a center of said image forming area in the direction of travel of the light from said light source before said image is displayed.

8. A transfer apparatus comprising:
   a light source;
   an image display unit of transmission type having an image display screen; and
   a light-sensitive recording medium accommodating unit that contains one or more light-sensitive recording media and which has an opening for exposing a light-sensitive recording medium as it is opposed to the image display screen of said image display unit and an outer frame into which said image display unit is fitted,
   wherein said light source, said image display unit and said light-sensitive recording medium are arranged in a direction of travel of light from said light source, said image displayed by said image display unit is transferred to said light-sensitive recording medium by exposing said light-sensitive recording medium to said light passing through said image display unit and said image display unit is so adapted that it is at least fitted into said outer frame of said light-sensitive recording medium accommodating unit.

9. The transfer apparatus according to claim 8, wherein a rib is provided on a periphery of said opening for exposing said light-sensitive recording medium of said light-sensitive recording medium accommodating unit in order to shield light from said light-sensitive recording medium and said image display unit is fitted into a space defined by an inner surface of said rib.

10. The transfer apparatus according to claim 8, wherein at least two of four peripheral sides of said image display screen of said image display unit are smaller in width than the other two.

* * * * *